United States Patent

[11] 3,621,380

| [72] | Inventor | Carl A. Barlow, Jr. |
| | | Dallas, Tex. |
| [21] | Appl. No. | 788,409 |
| [22] | Filed | Jan. 2, 1969 |
| [45] | Patented | Nov. 16, 1971 |
| [73] | Assignee | Texas Instruments Incorporated |
| | | Dallas, Tex. |

[54] METHOD AND APPARATUS FOR SEISMIC-MAGNETIC PROSPECTING
9 Claims, 6 Drawing Figs.

[52] U.S. Cl. .................................................... 324/1,
324/6, 324/8, 340/15.5 TA
[51] Int. Cl. ................................................. G01v 3/00,
G01v 11/00
[50] Field of Search .......................................... 324/1, 8, 6;
340/15.5 TA

[56] References Cited
UNITED STATES PATENTS

| 2,054,067 | 9/1936 | Blau et al. ................... | 324/1 X |
| 2,527,559 | 10/1950 | Lindblad et al. .............. | 324/6 |
| 3,158,830 | 11/1964 | Clay .......................... | 340/15.5 TA |
| 3,234,504 | 2/1966 | Wischmeyer .................. | 340/15.5 TA |
| 3,302,164 | 1/1967 | Waters et al. ................. | 340/15.5 TA |
| 3,392,327 | 7/1968 | Zimmerman .................. | 324/1 |
| 1,919,917 | 7/1933 | Truman ....................... | 324/6 |
| 2,657,380 | 10/1953 | Donaldson .................... | 324/6 X |
| 3,524,129 | 8/1970 | Ikrath ......................... | 324/6 |

OTHER REFERENCES

Broding et al., Field Experiments on the Electroseismic Effect, IEEE Transactions on Geoscience Electronics, Dec. 1963 pp. 23– 31

*Primary Examiner*—Gerard R. Strecker
*Attorneys*—Samuel M. Mims, Jr., James O. Dixon, Andrew M. Hassell, Harold Levine, Melvin Sharp and Richards, Harris and Hubbard

ABSTRACT: Seismic disturbances are impinged upon underground magnetic bodies to cause time varying changes in the magnetic field of the bodies. These time varying changes are sensed to provide indications of the magnetization and depth of the bodies. Seismic reflections from the seismic disturbances are also sensed and recorded, with the time varying changes processed in conjunction with the seismic reflections to eliminate noise and otherwise enhance the magnetic data.

PATENTED NOV 16 1971          3,621,380

INVENTOR
CARL A. BARLOW, JR.

METHOD AND APPARATUS FOR SEISMIC-MAGNETIC PROSPECTING

This invention relates to the detection of magnetic bodies, and more particularly to seismic exploration utilizing seismic-magnetic techniques.

Seismic exploration for magnetic ore deposits has been long conducted by measuring the distortion of the earth's magnetic field caused by the presence of magnetically permeable material within the field. However, such exploration has been limited with respect to the depth of exploration possible, and has generally not been able to differentiate between large volumes of low susceptibility material and smaller volumes of high susceptibility material. An additional problem which has long been associated with the standard exploration method is the lack of a zero-reference, or nominal value of the earth's undistorted field at the prospect site. Moreover, previously developed magnetic exploration techniques have not provided accurate indications of the depth or shape of the magnetic deposits.

It has been heretofore determined that changes in the magnetic field of magnetic ore deposits may be induced by seismic excitation of the ore deposits. For example, B. A. Undzendov et al. in an article entitled "Seismomagnetic Effect In a Magnetite Deposit," Earth Physics, No. 1, 1967, page 121–126, described irreversible DC level changes which occur in the magnetization of a metalliferous body upon the impingement of compression waves. However, a practical technique for determining the size, depth, and type of magnetic body has not been heretofore developed.

In accordance with the present invention, an acoustic disturbance is generated and directed toward a subsurface body. Time varying changes in the magnetic field of the subsurface body due to the impingement of the disturbance are sensed, and indications of the time intervals between the generation of the acoustic disturbance and the impingement of the disturbance on the subsurface body are determined.

In accordance with a more specific aspect of the invention, seismic disturbances are impinged upon a subsurface body and seismic reflections therefrom are sensed and recorded. The seismic disturbances cause time varying changes in the magnetic field of the subsurface body which are sensed and recorded. The seismic reflections are cross-correlated with the time varying changes in the magnetic field to eliminate noise. The enhanced signals are then processed by deconvolution techniques to provide indications of the magnetization and the location of the subsurface body.

For a more complete understanding of the present invention and for further objects and advantages thereof, reference is now made to the following description taken in conjunction with the accompanying drawings, in which:

FIG. 1 diagrammatically illustrates the detection of time varying changes in the magnetic field of a subsurface body according to the invention;

Figure 1:
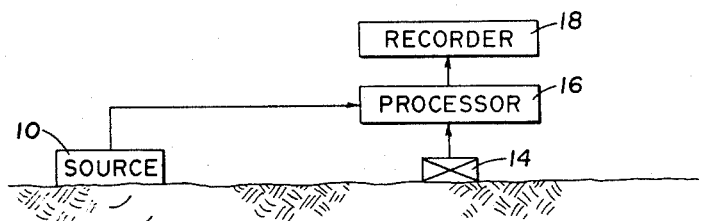

Referring to FIG. 1, the seismic source 10 generates compressional seismic waves which travel through the earth in the well-known manner. The compressional waves impinge upon a magnetic body designated generally by the numeral 12 and cause translation and realignment of certain of the magnetic dipoles of the magnetic body 12. The resulting time varying changes in the magnetic field of the magnetic body 12 are sensed by a conventional magnetometer 14. The variances in the magnetic field are transduced into electrical signals which are fed into a signal processor system 16. Indications of the time of generation of the seismic waves are fed into the processor 16 from the source 10. Conventional data manipulations such as inverse convolution, commonly termed deconvolution, are performed upon the signals by the processor 16 in order to provide indications of the magnetization and the depth of the magnetic body 12. The output from processor 16 is recorded by a conventional recorded 18.

Figure 2:
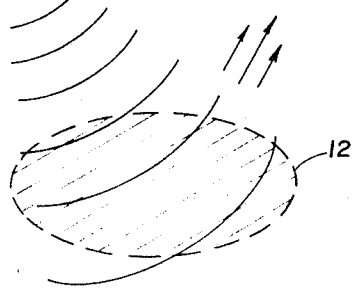
FIG. 2 illustrates an idealized waveform of a seismic disturbance utilized in the invention.

In order to facilitate the explanation of the present invention, the idealized noncontinuous seismic pulse shown in FIG. 2 will be assumed to be generated by the source 10. The travel of the seismic pulse through nonmagnetic sections of the earth produces almost no variance in the magnetic field being sensed by the magnetometer 14.

The magnetic body 12 is assumed to comprise a large number of dipoles magnetically oriented in the same direction, and it will be assumed for purposes of theoretical explanation that the magnetic body 12 is very similar acoustically to the surrounding earth. Thus no appreciable reflection of the acoustic waves are generated as a result of penetration by the compressional wave of the magnetic body 12. At the instant that the leading edge of the acoustic pulse shown in FIG. 2 impinges upon the upper region of the magnetic body 12, the dipoles at this upper region will be slightly moved due to the physical movement of the magnetic body by the compressional wave. The slight movement of the dipoles causes AC, or time varying, changes in the magnetic field of the magnetic body 12. This variance of the magnetic field is sensed by the magnetometer 14.

Figure 3:
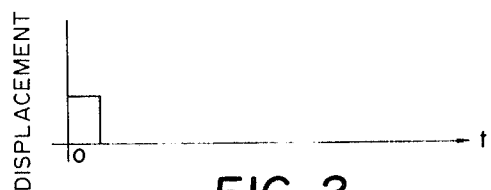
FIG. 3 illustrates the variance of the magnetic field of a subsurface body due to the impingement of the seismic disturbance shown in FIG. 2.

FIG. 3 illustrates the variance of the magnetic field of body 12 as a result of the impingement of a single seismic pulse as a function of time. FIG. 3 of course assumes a zero ambient earth magnetic field. The instant of generation of the acoustic pulse from the source 10 is designated as time zero. At time $t_1$, the leading edge of the acoustic pulse impinges upon the magnetic body 12 and the magnetic field sensed by magnetometer 14 sharply decreases. As a acoustic pulse passes through the magnetic body 12, the magnitude of change in the magnetic field slightly decreases due to the decrease in the amplitude of the acoustic pulse. When the acoustic pulse exits the lowermost region of the magnetic body 12, the magnetic field sharply increases. The magnetic field returns generally to the steady state position at $t_2$ when the acoustic pulse completely exits the magnetic body 12.

The information contained in the waveform of FIG. 3, taken in conjunction with the wave shape and amplitude of the acoustic signal generated, may be utilized to provide indications of the depth and the magnetization of the magnetic body 12. In order to determine the depth, the time interval $0-t_1$ is multiplied by the speed of the acoustic pulse through the earth. To obtain the depth of the lowermost portion of the magnetic body 12, the time interval $0-t_2$ is multiplied by the speed of the acoustic pulse. By proper processing of the measured changes in the magnetic field, to be later described in greater detail, the magnetization of the magnetic body 12 may be accurately determined. For instance, with the use of the single acoustic pulse shown in FIG. 2, the measured changes in the magnetic field need only be multiplied by a gain factor which is easily determined by conventional acoustic methods.

Figure 4:
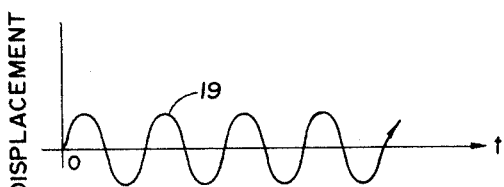
FIG. 4 illustrates another idealized waveform of a seismic disturbance.
Figure 5:
FIG. 5 illustrates the variance of the magnetic field of a subsurface body due to the impingement of the seismic disturbance of FIG. 4.

FIG. 4 illustrates a periodically varying acoustic wave 19 generated by the source 10. Such a wave may for instance be generated by a conventional motor driven diaphragm pressed against the surface of the earth by the weight of a truck or the like. FIG. 5 illustrates time varying changes in the magnetic field of the body 12 caused by the compressional wave 19. The time interval $0-t_1$ is the time of travel of the leading edge of the acoustic wave 19 to the uppermost portion of the magnetic body 12. Multiplication of this time interval by the speed of the acoustic wave 19 provides an indication of the depth of the uppermost portion of the magnetic body 12.

It will be seen that after the seismic signal 19 has penetrated the entire volume of magnetic deposit, that the excursions of the magnetic field are reduced below the values near time $t_1$, and become effectively of constant amplitude, due to partial cancellation of opposing directions of movement by the magnetic body 12 caused by the positive and negative portions of the acoustic wave 19 traveling therethrough. As the magnetometer 14 senses the total effect of the acoustic wave upon the magnetic body 12, integration of the changes in the magnetic field is necessary. This integration is completed within the processor 16 which provides a representation of the time variance of the magnetic field.

The change of the magnetic field as a function of time is easily determined from classical electromagnetic theory. As a practical example, in the case wherein the seismic disturbance causes the dipoles of the magnetic deposit to undergo translation without realignment, it may be shown that:

$$\vec{H}(\vec{x}_o, t) = -\int d^3x \vec{\mu}(\vec{x}, t) \cdot \vec{\nabla} \vec{D}(\vec{x}_o - \vec{x}_o - \vec{x}),$$

where, $\vec{H}(\vec{x}_o, t)$ = time varying changes in the magnetic field at position $\vec{x}_o$ at time $t$, $\vec{x}$ = space location of magnetic sources, $\vec{\mu}(\vec{x}, t)$ = vector displacement at position $\vec{x}$ at time $t$, and $\vec{D}$ = the dyadic defined as follows:

$$\vec{D}(\vec{r}) = |\vec{r}|^{-3}\{\vec{I} - 3|\vec{r}|^{-2}\vec{r}\vec{r}\}$$

where $\vec{I}$ = the unit dyadic.

As $(\vec{x}_o, t)$ and the depth of the magnetic body 12 are known, the relative magnetization of the body 12 as a function of depth may be determined by the processor 16 by conventional deconvolution processing.

Disclosures of conventional deconvolution, or inverse convolution, techniques with time varying traces are described in *Geophysics*, V. 27, P. 317–326; *Geophysical Prospecting*, V. 9, P. 317–341; and in *Geophysics*, V. 27, p. 4–18.

As previously mentioned, problems in magnetic noise may occur during the practice of the invention. For instance, the generation of a compressional wave by the source 10 will cause surface seismic waves which may tend to slightly move the magnetometer 14, thereby causing the magnetometer to move through the ambient magnetic field of the earth and thus create magnetic noise. This noise may be minimized by placing the magnetometer 14 upon a movement isolating platform. Additionally, due to the fact that the earth's surface is slightly electrically charged, movements of the earth may cause variations in the magnetic field which may be sensed by the magnetometer 14.

When dynamite is utilized as a source of acoustic pulses, a blast of air containing charged ions may be emitted from the blast hole to produce sharp spikes of variances in the magnetic field at the onset of the measurement by the magnetometer 14. However, these spikes will usually be of short duration and will thus not interfere with the actual record taking portion of the magnetometer 14. Movement of trucks or other heavy equipment relative to the earth's ambient field will also cause variations in the magnetic field which are sensed by the magnetometer 14.

When generating a continuous periodic acoustic wave with a constant frequency, the sensing equipment of the invention may be made with a narrow bandwidth in order to discriminate against noise. When a seismic wave with a varying frequency is utilized such as a linear ramp frequency variance, it will be advantageous to correlate the sensed changes in the magnetic field with received acoustic reflections from the seismic wave. A preferred embodiment of the invention for elimination of noise is illustrated in FIG. 6.

Figure 6:
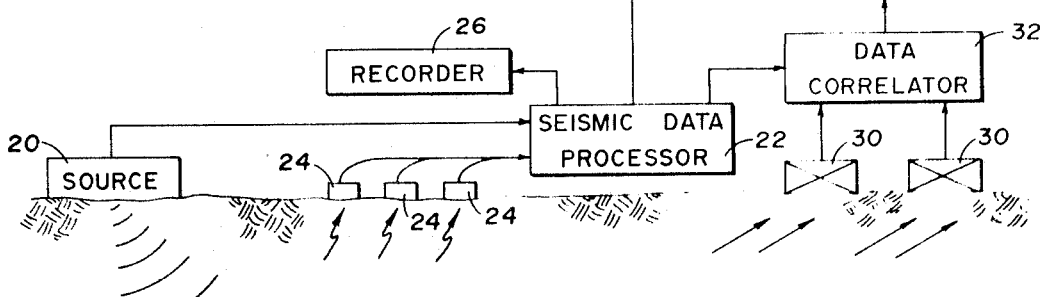
FIG. 6 is a block diagram of the preferred seismic exploration embodiment of the invention.

Referring to FIG. 6, the seismic source 20 generates compressional waves which may comprise a series of discontinuous pulses, a continuously varying periodic wave, or a continuous wave having a varying frequency. Source 10 may comprise, for instance, charges of dynamite, a mechanically oscillating diaphragm, a relatively large mass which is periodically moved by explosions of gas or the like, or any one of the various types of seismic wave sources conventionally utilized. Indications of the output of the acoustic source 20 are fed directly to a seismic data processor 22. A plurality of geophones 24 receive indications of the reflections of the generated seismic waves and generate electrical signals representative thereof which are applied to an input of the seismic data processor 22. The outputs of the geophones 24 are processed in accordance with conventional seismic techniques and are recorded on a conventional seismic recorder 26. For instance, the outputs of the geophones 24 may be filtered and stacked in the well-known manner.

Changes in the magnetic field of a subsurface magnetic deposit 28 are sensed by a plurality of magnetometers 30. The magnetometers may be of the type described in U.S. Pat. No. 2,996,657, and in a number of other patents. Alternatively, the magnetometers may be of the type manufactured and sold by Texas Instruments Incorporated, of Dallas, Tex., and designated as Meta-Stable Helium Magnetometers.

The outputs of the magnetometers 30 are fed into a data correlator system 32. The correlator 32 performs cross-correlation techniques between the processed seismic data from the processor 22 and between the changes in the magnetic field from the magnetometers 30. Such correlation techniques are commonly used between seismic inputs in order to eliminate noise. The same techniques are applied in the present invention to eliminate noise, as portions of the magnetic field signals containing noise may be ignored which are not correlated with the received acoustic wave.

The correlator 32 may comprise any one of a number of known correlation systems wherein an input signal is multiplied by a delayed replica of the second signal and then averaged as by passing through a low-pass filter or integrator. By varying the delay time, an indication of the coherence between the two waveforms may be determined. For a more detailed explanation of conventional cross-correlation circuits and techniques, reference is made to *Introduction to Radar Systems*, by Merrill I. Skolnik, pp. 418–423, McGraw-Hill, 1962.

After the correlation of the seismic and magnetic signals, an output is provided to a data processor system 34. An input is also provided to the processor 34 from the seismic data processor 22. The signals are processed, such as with the deconvolution techniques previously described, in order to provide an output signal to a recorder 36 which is representative of the magnetization as a function of time of the area being surveyed. Due to the fact that a plurality of magnetometers 30 are provided, indications of the relative shape of the magnetic ore deposit 28 may be provided.

Although the present invention has been described with respect to seismic prospecting, it will be understood that the invention theory may be applicable in the detection of magnetic bodies other than ore deposits, such as underwater craft such as submarines or the like.

Whereas the present invention has been disclosed with respect to several specific embodiments thereof, it will be understood that various changes and modifications will be suggested to one skilled in the art, and it is intended to encompass those changes and modifications as fall within the true scope of the appended claims.

What is claimed is:

1. The method of seismic exploration comprising:
   a. generating a seismic disturbance,
   b. generating first electrical signals representative of time varying changes in the magnetic field of subsurface structure caused by impingement of said seismic disturbance upon said structure,
   c. receiving reflections of said seismic disturbance,
   d. generating second electrical signals representative of said reflections, and
   e. processing said first signals in conjunction with said second signals to enhance said first signals and produce an output signal representative of the magnetization and depth of said subsurface structure.

2. The method of claim 1 wherein said processing comprises:
cross-correlating said first and second signals.

3. The method of claim 1 and further comprising:
deconvolving said first signals to generate output signals representative of the magnetization and depth of said subsurface structure.

4. The method of claim 1 and further comprising:
generating representations of the time interval between the generation of said seismic disturbance and the impingement of said seismic disturbance on said subsurface structure.

5. Apparatus for detection of a magnetic structure comprising:
 a. a source for directing compressional signals toward said magnetic structure,
 b. means for detecting time varying changes in the magnetic field of said magnetic structure caused by the impingement of said compressional signals,
 c. means for generating indications of the time intervals between generation of said compressional waves and the impingement thereof on said magnetic structure, and
 d. means responsive to said detected time varying changes and said indications of time intervals for generating representations of the magnetization and position of said magnetic structure.

6. The apparatus of claim 5 and further comprising:
means for cross-correlating signals representative of said changes in the magnetic field.

7. The apparatus of claim 5 and further comprising:
means for deconvolving said time varying changes in the magnetic field for generating said representations of the magnetization of said magnetic structure.

8. The apparatus of claim 5 wherein said means for detecting comprises at least one magnetometer.

9. The apparatus of claim 5 and further comprising geophone means for generating electrical signals in response to said compressional signals.